Patented Aug. 11, 1936

2,051,017

UNITED STATES PATENT OFFICE 2,051,017

PROCESS FOR PRODUCING FROM PLANT MATERIALS PROTEIN DECOMPOSITION PRODUCTS, MINERAL SALTS, AND SOLUBLE CARBOHYDRATES

Robert Schwarz, White Plains, and Stephen Laufer, Brooklyn, N. Y.; said Laufer assignor to said Schwarz No Drawing. Application July 9, 1932,
Serial No. 621,748

4 Claims. (Cl. 99—27)

This invention relates to the production of readily assimilable protein decomposition products with mineral salts and soluble carbohydrates by the action of a combination of proteolytic and malt enzymes upon protein-bearing plant materials, and in any desired form, such as concentrated syrup, dry powder, solution or extract.

The protein decomposition products are in the form of albumose-peptone, amide—and amino-nitrogen.

The process is characterized by the hydrolysis of the proteins as well as the gummy substances pentosans, galacto-araban, starch and pectin which are present in the protein-bearing plant materials acted upon, thereby producing a new product and rendering commercially feasible the separation of substantially all of the proteolytic decomposition products of the plant material.

Cottonseed meal, soya bean meal, peanut cake, linseed meal, sunflower cake, lupin seeds and other similar plant products contain relatively high percentages of proteins, which, while partly soluble, are not readily assimilable. Processes have been proposed for the extraction and separation of the proteins from plant materials but these processes in many respects are differentiated from the present process.

We have discovered that by heating the suitable plant material such as cottonseed meal, soya bean meal, peanut cake, sunflower cake, linseed meal, lupin seeds and the like, in an aqueous suspension, either with or without pressure, in order to disintegrate the cell walls and set free the cell contents, and after cooling to suitable temperature, adjusting to the hydrogen-ion concentration required for the specific enzyme employed, and subjecting to the action of proteolytic enzymes such as papain, pepsin, bromelin, combined with the enzymes of malt, so as to secure the action of the malt, we can hydrolyze and reduce to readily recoverable, simplified and assimilable form, a large percentage,—in fact, over 50%—of the soluble and insoluble proteins originally present in the substances subjected to our process,—and hydrolyze and recover a substantial part of the carbohydrates and dissolve and recover practically all of the soluble mineral salts.

Our process, for example, may be carried out as follows:—

100 parts of soya bean meal are suspended in about 750 parts of water heated for one hour under pressure of 15 to 60 pounds, if boiled without pressure, the time of the reaction is suitably lengthened. The suspension is then cooled to 44° C. (111° F.) by means of a cooling coil. Cold water may be added to produce a thinner suspension. Papain or other suitable proteolytic enzyme is then added to soya meal in the proportion of .1% (1 part papain to 1000 parts of soya meal) and 3 to 10 parts of ground malt of good enzymic strength, such as coarse ground barley malt. The suspension is then adjusted to the optimum hydrogen-ion concentration for enzyme reaction required for the greatest activity of the enzyme used. When papain is employed, this mixture is held at 44° C. (111° F.) for 30 minutes. Then, in 30 minutes, it is heated to 65° C. (149° F.) and for a period of one hour held at 65° to 70° C. (149° to 158° F.), then for 30 minutes at 70° to 75° C. (158° to 167° F.) and finally heated to about 79° C. (174° F.) whereupon, it will have somewhat the consistency of a grain mash. It is then filtered and the filter residue washed in the usual manner.

When pepsin or other suitable proteolytic enzyme is employed, the acidities and temperatures used in the process are those most suitable for the maximum proteolytic activity for the enzyme employed.

The solution obtained, as above described, can be concentrated to suitable consistency by any suitable means, as by a vacuum process, with or without the addition of admixture of fillers such as cane sugar, maltose sugar or syrup, malt extract, dextrins, etc.; that is, any substances which are not incompatible with the purpose for which the extract derived from the nitrogenous material is designed.

A distinguishing step in our process, is that valuable assimilable substances, which accompany the protein, and which by other processes would be left in the filter press, for example, gummy substances, pentosans, galacto-araban, starch and pectin, are in part hydrolyzed and are recovered as decomposition products in the filtered solution. Not only is this recovery important from the standpoint of obtaining them in the concentration, but their hydrolyzation greatly assists the separation of the dissolved proteolytic decomposition products. The said substances, if not hydrolyzed, interfere with said separation.

The nitrogenous proteolytic decomposition products with the mineral substances and carbohydrates derived from the vegetable materials cited, are very readily assimilable and easily digested, and therefore, are of value as food products, especially in the production of concentrated nutriments of the nature of meat extract, (i. e., having protein concentration comparable with, or exceeding, meat extract), and substitutes for meat proteins. Similarly, the product with or without the addition of further soluble carbohydrates such as sugar, presents excellent culture media for the growth of micro-organisms. Furthermore, the extracts produced by our process are highly suited for the production of medicinal preparations, when mixed with products such as codliver oil, iron or calcium salts, hypophosphites, etc.

The form of the recovered material ready for use may be an extract or concentrate, and the material may be subjected to a dehydrating process to have the form of a syrup or dry powder.

Having described our invention, what we claim and desire to secure by Letters Patent, is as follows:—

1. A process for producing from protein rich plant material including soya bean meal, cotton seed meal, lupin seeds and the like, a product containing soluble mineral salts, soluble carbohydrates and assimilable nitrogenous substances, which comprises heating said material in an aqueous suspension, thereby disintegrating the cell walls of the said plant material, adjusting the suspension to the hydrogen-ion concentration required for a given proteolytic enzyme, and treating the suspension with said enzyme, in combination with ground malt, and separating the solution so produced from the insoluble residue.

2. A process for producing from nitrogenous rich plant material containing carbohydrates, such as pectins, galacto-araban and pentosans, a product containing soluble mineral salts, soluble carbohydrates and assimilable nitrogenous substances, which comprises heating said material in an aqueous suspension thereby disintegrating the cell walls of said plant material, treating the suspension with a proteolytic enzyme and also adding to the suspension ground malt, heating, and then separating the solution so produced from the insoluble residue.

3. A process for producing from protein rich plant material including soya bean meal, cotton seed meal, lupin seeds and the like, a product containing soluble mineral salts, soluble carbohydrates and assimilable nitrogenous substances, which comprises heating said material in an aqueous suspension, thereby disintegrating the cell walls of the said plant material, adjusting the suspension to the hydrogen-ion concentration required for a given proteolytic enzyme, and treating the suspension with said enzyme, in combination with ground malt, separating the solution so produced from the insoluble residue and reducing the said solution to syrupy consistency or powder.

4. A process for producing from nitrogenous rich plant material containing carbohydrates, such as pectins, galacto-araban and pentosans, a product containing soluble mineral salts, soluble carbohydrates and assimilable nitrogenous substances, which comprises heating said material in an aqueous suspension thereby disintegrating the cell walls of said plant material, treating the suspension with a proteolytic enzyme and also adding to the suspension ground malt, heating, then separating the solution so produced from the insoluble residue and reducing the said solution to a syrup or powder.

ROBERT SCHWARZ.
STEPHEN LAUFER.